May 12, 1936.  C. W. HUOTARI  2,040,382
MOTOR VEHICLE SIGNAL
Filed April 2, 1934     5 Sheets-Sheet 1

Inventor
C. W. Huotari

By Clarence A. O'Brien
Attorney

May 12, 1936.　　　C. W. HUOTARI　　　2,040,382
MOTOR VEHICLE SIGNAL
Filed April 2, 1934　　　5 Sheets-Sheet 2

Inventor
C. W. Huotari

By Clarence A. O'Brien
Attorney

May 12, 1936.  C. W. HUOTARI  2,040,382
MOTOR VEHICLE SIGNAL
Filed April 2, 1934  5 Sheets-Sheet 3
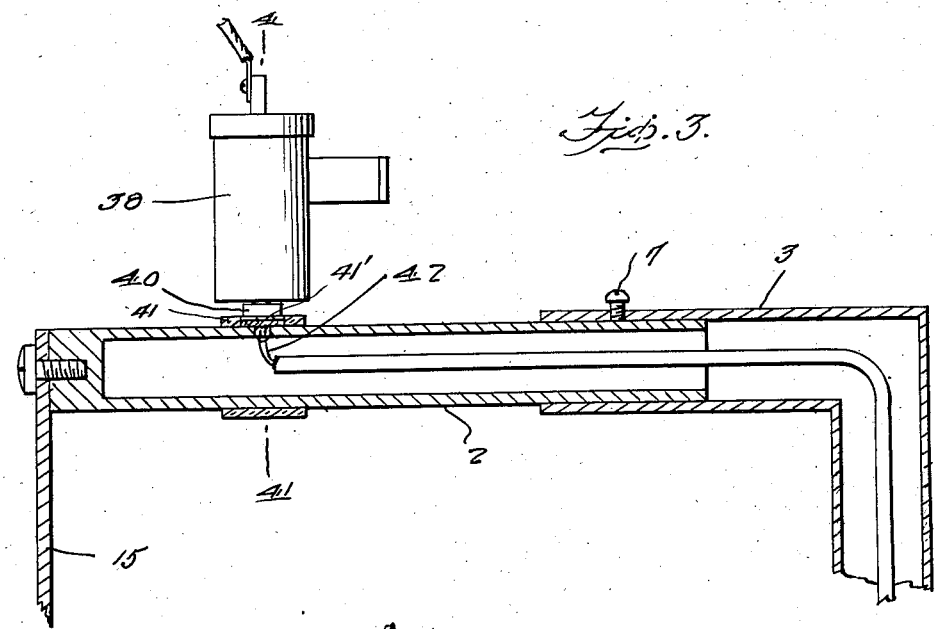
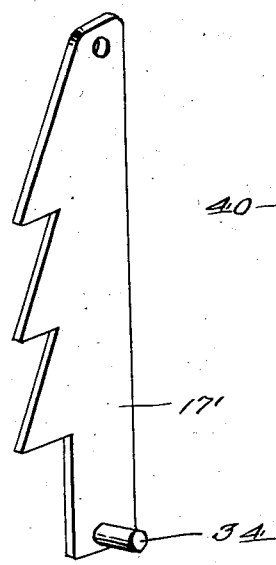
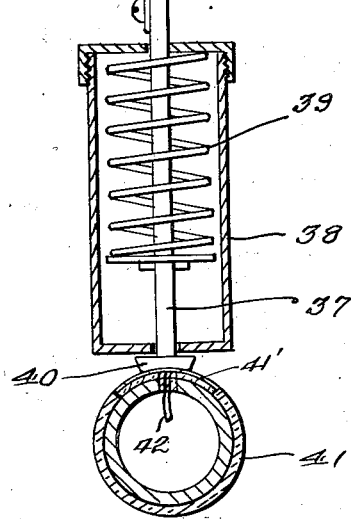
Inventor
C. W. Huotari
By Clarence A. O'Brien
Attorney May 12, 1936.  C. W. HUOTARI  2,040,382
MOTOR VEHICLE SIGNAL
Filed April 2, 1934  5 Sheets-Sheet 4
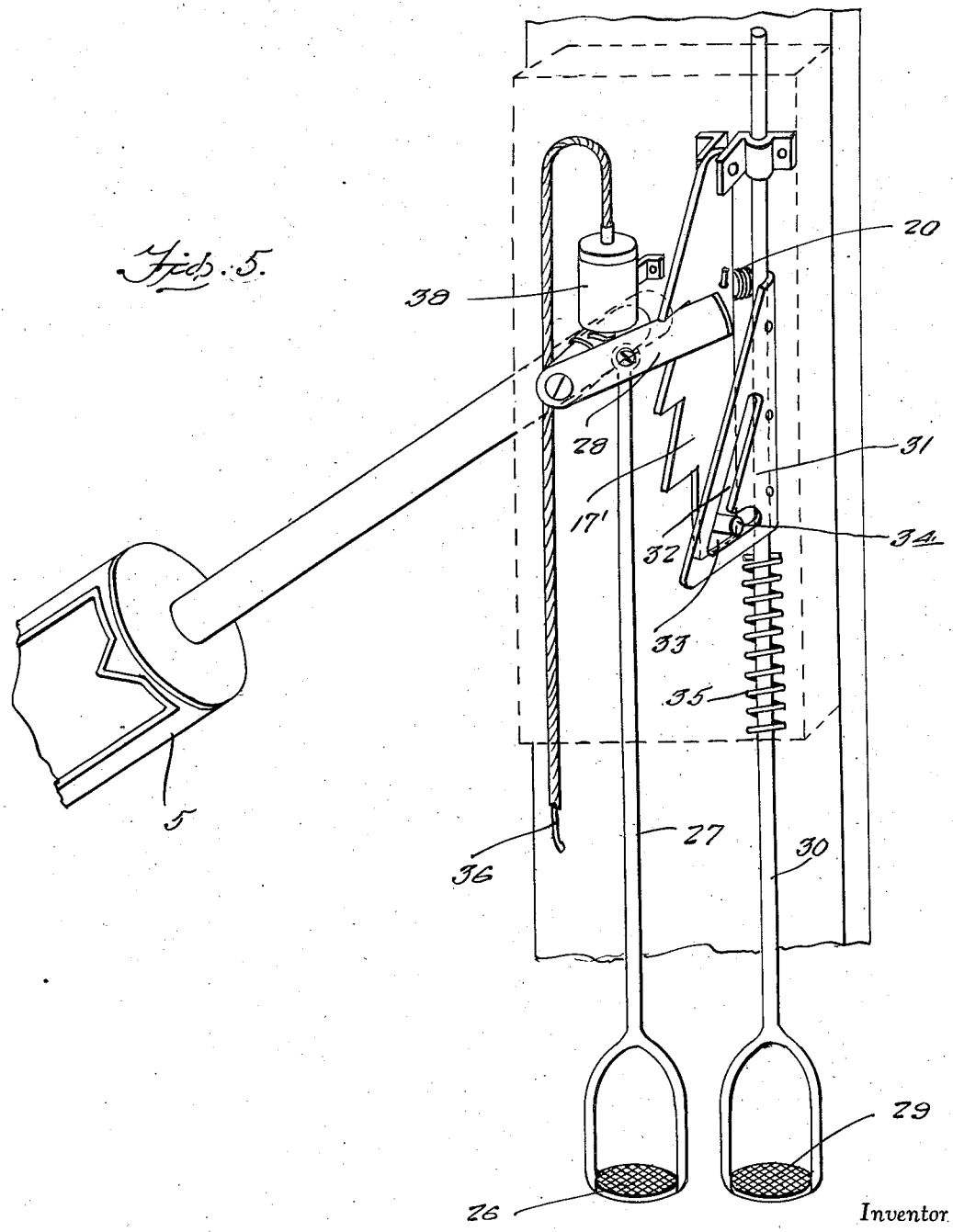
Inventor
C. W. Huotari
By *Clarence A. O'Brien*
Attorney May 12, 1936.  C. W. HUOTARI  2,040,382
MOTOR VEHICLE SIGNAL
Filed April 2, 1934   5 Sheets-Sheet 5
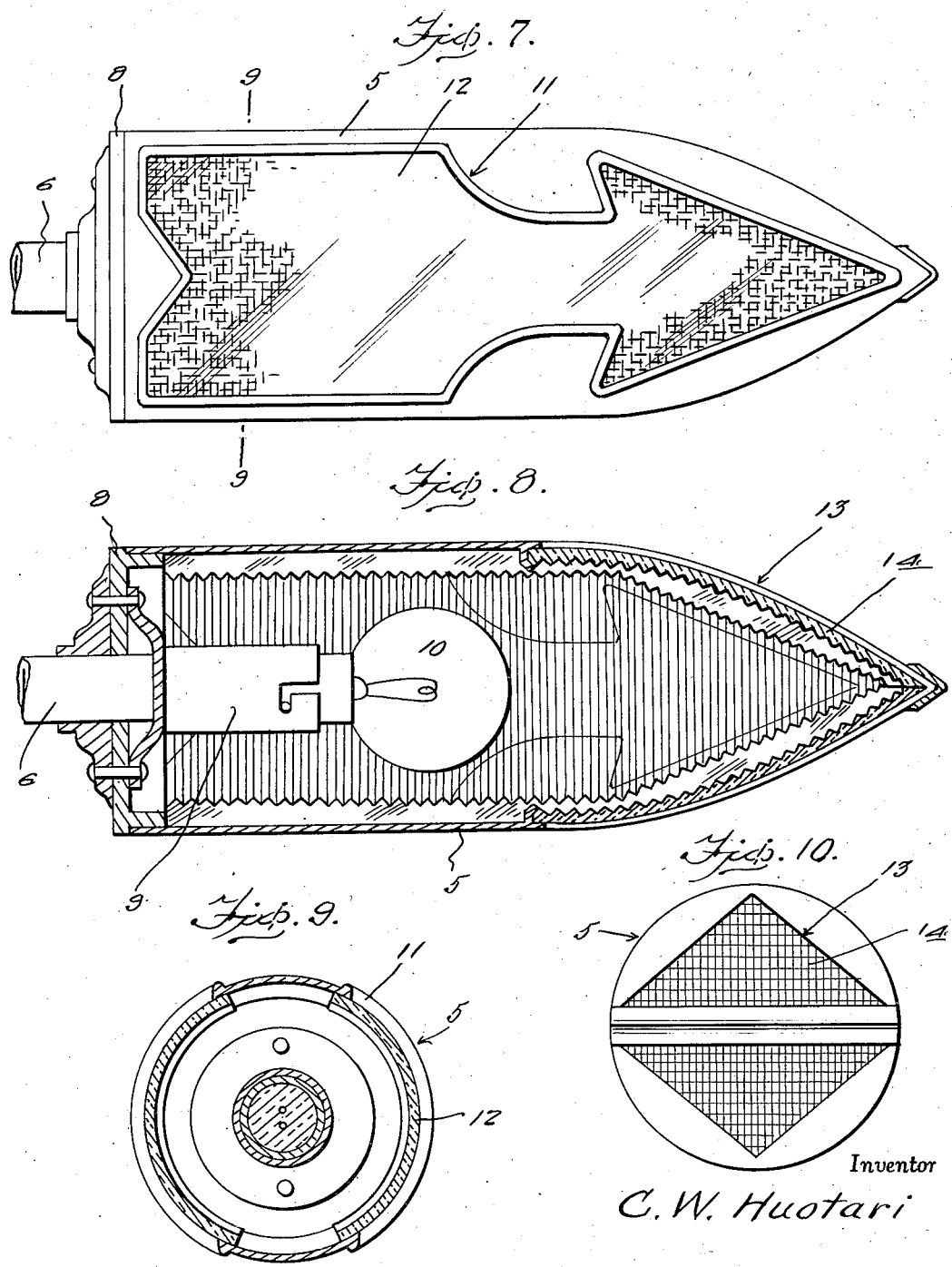
Inventor
C. W. Huotari
By Clarence A. O'Brien
Attorney Patented May 12, 1936

2,040,382

UNITED STATES PATENT OFFICE 2,040,382

MOTOR VEHICLE SIGNAL

Charles W. Huotari, Los Angeles, Calif.

Application April 2, 1934, Serial No. 718,719

2 Claims. (Cl. 116—54)

This invention relates to a motor vehicle signal, the general object of the invention being to provide simple means for indicating when the vehicle is to make a right or left turn or is to stop, with means whereby the signal can be actuated by the driver or operator of the vehicle.

A further object of the invention is to make the signal member in such a manner that it can be readily observed both from the rear and front of the vehicle and from the sides thereof.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 3 is a sectional view through the rotary member of the signal and showing the brush for controlling the electric circuit to the lamp.

Figure 4 is a section on line 4—4 of Figure 3.

Figure 5 is a view showing a modification.

Figure 6 is a view of the notched plate shown in Figure 5.

Figure 7 is a side view of the signal casing.

Figure 8 is a longitudinal sectional view through the signal casing.

Figure 9 is a section on line 9—9 of Figure 7.

Figure 10 is an end view of the signal casing.

Figure 1:
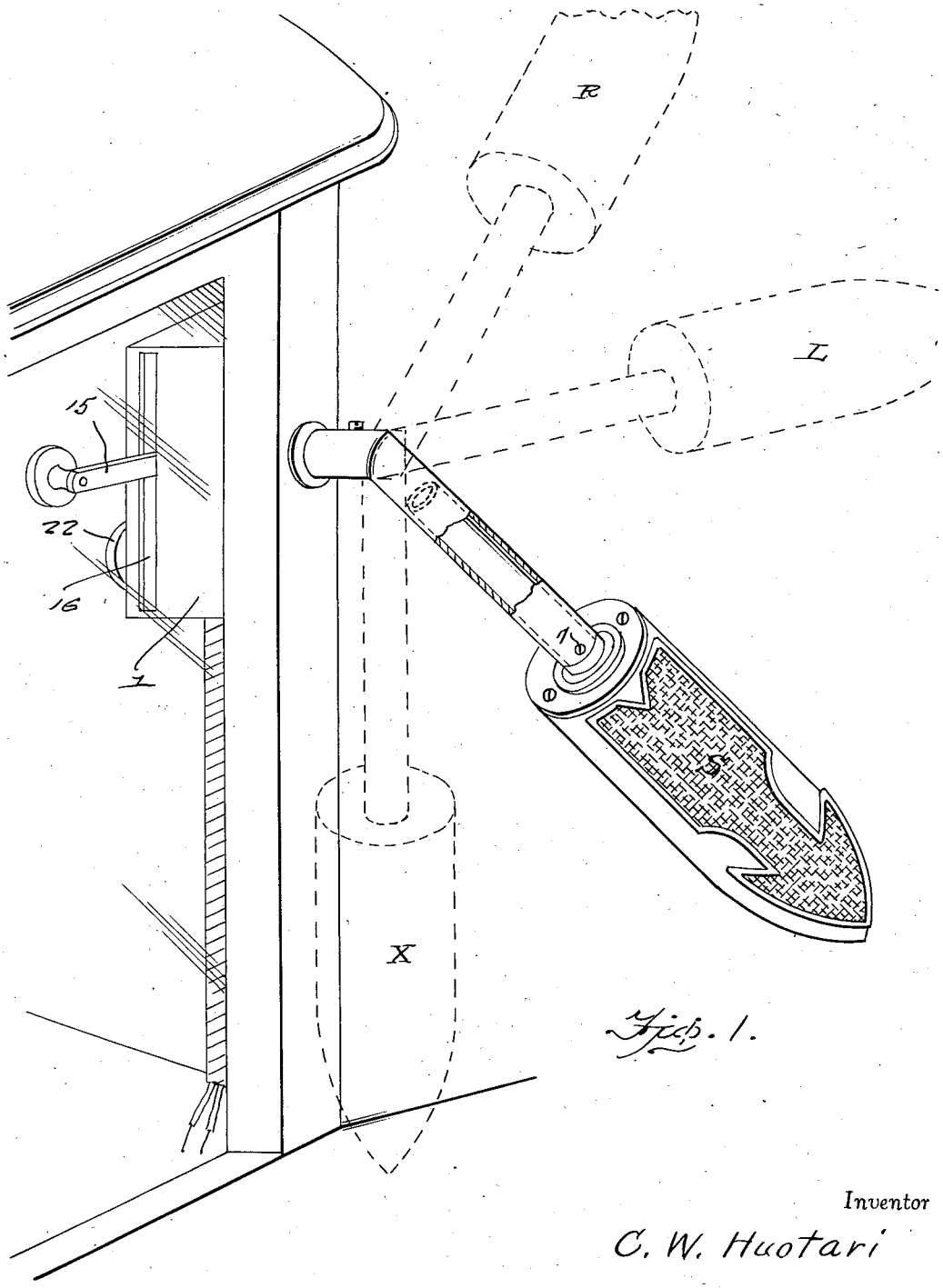
Figure 1 is a perspective view of portion of an automobile, showing the invention in use thereon.

In these drawings, the numeral 1 indicates a box which is adapted to be suitably connected to the left hand front corner of the body of the vehicle on the interior thereof and a tubular shaft 2 passes through the box and is rotatably supported therein and an elbow-shaped tubular shaft 3 has one end adjustably connected with the outer end of the shaft 2, as shown at 4, the outer end of the shaft 2 passing through a hole formed in the corner post and passing through the front face of the post, as shown in Figure 1. A signal casing 5 has a tubular stem 6 connected to its base part which telescopes into the outer portion of the member 3 and these parts are adjustably connected together by screws, one of which is shown at 7. The casing 5 has its major portion of cylindrical shape, with its outer end pointed, as shown, and the cylindrical part of the casing is detachably connected to the base 8. A socket 9 is located in the signal casing and carries the bulb 10 and the front and rear parts of the casing are provided with the arrow-shaped openings 11 which are covered by the similarly shaped transparent members 12, each of which is corrugated transversely, as shown in Figure 8, and I prefer to make the front transparent member yellow and the rear one red. A pair of openings 13 is formed in the outer end of the signal casing and each opening 13 is arranged a quarter turn from the heads of the arrow-shaped openings 11 and corrugated lenses 14 cover these openings 13 and I prefer to make these transparent members 14 of red color. I prefer to make the openings as shown in Figures 7, 8 and 10, so that the maximum amount of light will pass from the casing when the bulb is lighted and when the device is in raised position, as shown by the letters R, L and S in Figure 1, it will be seen that the illuminated casing can be seen from both the front and rear of the automobile and from the sides thereof. When looking at the device from certain points, the arrow heads seem larger due to the construction and arrangement of the casing and the openings therein.

Figure 2:
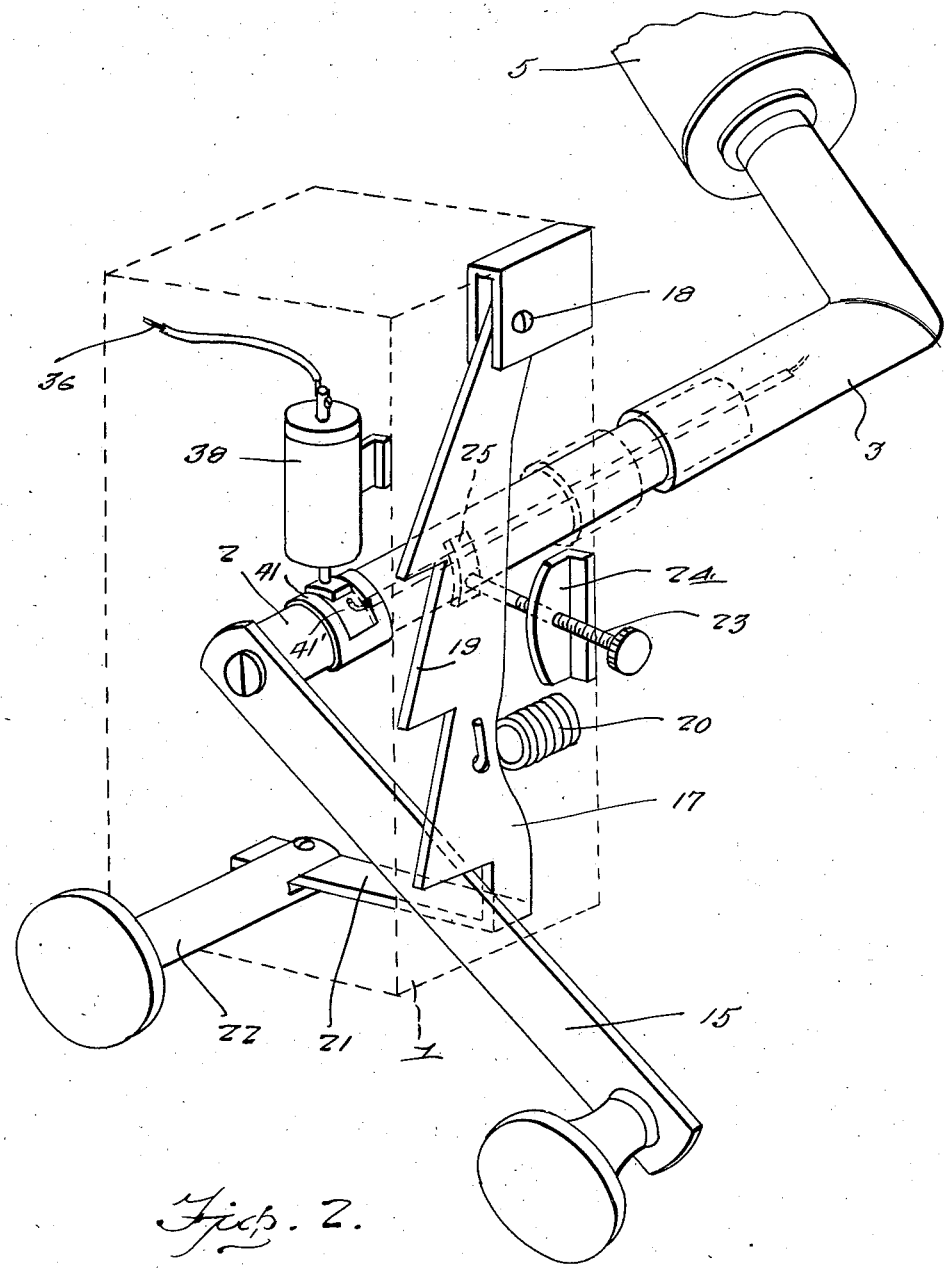
Figure 2 is a perspective view of the device, showing the interior parts.

In the first form of the invention, a handle 15 is connected to the inner end of the shaft 2 and passes through a slot 16 in the box so that it can be reached by the operator of the vehicle, and a plate 17 is pivoted in the box at its upper end, as shown at 18, and the inner edge of the plate is formed with the three notches 19 forming three shoulders for engagement by the handle 15 for holding the handle with the signal member in operative position. A spring 20 pushes the plate 17 toward the handle 15 so that the handle will be held in lowered position by one of the shoulders. A right angle extension 21 is formed on the lower end of the plate and a handle 22 is connected to the extension and passes through a hole in the box and by pushing inwardly on this handle 22, the plate 17 is pressed against the action of the spring 20 so that it will move out of the path of the handle 15 to permit the signal casing to drop by gravity to its inoperative position, shown at X in Figure 1. It will, of course, be understood that as the plate 17 moves inwardly and the signal casing drops downwardly under the action of gravity, the handle 15 moves upwardly. Then when the handle is moved downwardly by the operator, it will slide over the beveled inner edge of the plate 17 and if the operator wishes to display the "Stop" signal, he lets the handle 15 rest in the upper notch, but if he wishes to indicate a left turn, he moves the handle downwardly until it engages the intermediate notch and then if he wishes to indicate a right turn, he moves the handle into engagement with the lower notch, as shown in Figure 2. In order to prevent too free movement of the parts, I provide a brake device for the shaft 2 which includes a screw 23 passing through a threaded hole in the bracket 24 and having an arcuate member 25 at its inner end for engaging the shaft 2. Thus by turning the screw inwardly, the member 25 will frictionally engage the shaft 2 to act as a check for the rotary movement of the shaft.

When the signal is set in any one of its three positions, it can be easily returned to inoperative position by simply pushing in upon the handle 22, which pushes the plate 17 away from the handle 15, which permits the signal to return to inoperative position, shown at X in Figure 1.

Figure 5 shows a slight modification of the invention wherein the signal is operated from a pedal 26, the rod 27 of which is connected to the arm 28 which is attached to the end of the shaft and takes the place of the handle arm 15 so that by depressing the pedal with the foot, the signal is swung into operative position, as before described, and this figure also shows a pedal 29, the rod 30 of which is connected to a plate 31 which has an inclined slot 32 therein having a horizontal slot 33 communicating with its lower end. A pin 34 on the notched plate 17' extends into the slotted part of the plate 31 and a spring 35 on the rod 30 tends to hold the rod and plate 31 in an upper position with the pin 34 in the horizontal slot 33 so that the notched plate 17' will be moved against the action of its spring 20 when the arm 28 is swung downwardly. When it is desired to move the signal to inoperative position, the pedal 29 is depressed so as to move the plate 31 downwardly and this will cause the pin 34 to pass through the inclined slot 32 and thus the plate 17' will be moved away from the arm 28 to release the arm and thus the signal will return to inoperative position.

A conductor 36 passes from the battery of the car or from any other suitable source of electricity to the stem 37 slidably arranged in a cylinder 38 located in the box and the stem is normally pressed downwardly by a spring 39 in the cylinder 38 so as to press the head 40 of the stem against a contact strip 41' carried by a strip 41 of non-conducting material which surrounds a portion of the shaft 2. A conductor 42 is connected with the contact strip 41' and is insulated from the tube 2 and passes through said tube or tubular shaft 2 and through the tubular shaft 3 and the tubular stem 6 to the socket 9 of the bulb so that when the head 40 is in engagement with the contact strip 41' the current will flow to the bulb and return to the source by suitable ground means. However, when the head 40 is engaging the non-conducting strip 41, the circuit will be broken and these parts 41' and 41 are so arranged that when the signal arm is in the position X the circuit will be broken but when raised into any of the positions R, L and S, the circuit will be completed. Thus the circuit to the lamp is automatically controlled by the positioning of the signal casing.

Thus it will be seen that I have provided a simple form of directional signal for a motor vehicle and one which can be easily set to its three operative positions and which can be quickly released so that it will drop into inoperative position, with means whereby the signal can be operated either by hand or by the feet.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In a signal of the class described, a signal casing including a cylindrical portion terminating in a pointed portion, front and rear arrow-shaped windows in said casing having their heads extending into the pointed portion and windows in the pointed part of the casing arranged a quarter turn from the heads of the arrow-shaped windows, and a lamp in the casing.

2. In a signal of the class described, an arm including a horizontal portion and a portion extending at substantially right angles to the horizontal portion, a signal casing connected to the outer end of the right-angularly extending portion, said signal casing including a cylindrical portion terminating in a pointed portion, oppositely arranged arrow-shaped windows in said casing having their heads extending into the pointed portion, windows in the pointed portions placed opposite each other, and each window being located at quarter-turns from the heads of the arrow-shaped windows, means for illuminating said casing.

CHARLES W. HUOTARI.